July 18, 1950 R. E. SCHOCK ET AL 2,515,668

GATING CIRCUIT FOR DIVERSITY RECEIVERS

Filed Dec. 5, 1945 3 Sheets-Sheet 1

INVENTORS
ROBERT E. SCHOCK.
JOHN B. ATWOOD.
HAROLD O. PETERSON.
and GRANT E. HANSELL.
BY H. S. Grover
ATTORNEY July 18, 1950 R. E. SCHOCK ET AL 2,515,668

GATING CIRCUIT FOR DIVERSITY RECEIVERS

Filed Dec. 5, 1945 3 Sheets-Sheet 2

INVENTORS
ROBERT E. SCHOCK.
JOHN B. ATWOOD.
BY HAROLD O. PETERSON.
and GRANT E. HANSELL.
H. S. Grover
ATTORNEY

GATING CIRCUIT FOR DIVERSITY RECEIVERS

Filed Dec. 5, 1945 3 Sheets-Sheet 3

INVENTORS
ROBERT E. SCHOCK.
JOHN B. ATWOOD.
HAROLD O. PETERSON.
GRANT E. HANSELL.
BY H. S. Grover
ATTORNEY Patented July 18, 1950 2,515,668

UNITED STATES PATENT OFFICE 2,515,668

GATING CIRCUIT FOR DIVERSITY RECEIVERS

Robert E. Schock, John B. Atwood, Harold O. Peterson, and Grant E. Hansell, Riverhead, N. Y., assignors to Radio Corporation of America, a corporation of Delaware Application December 5, 1945, Serial No. 632,978

14 Claims. (Cl. 250—8)

Figure 1:
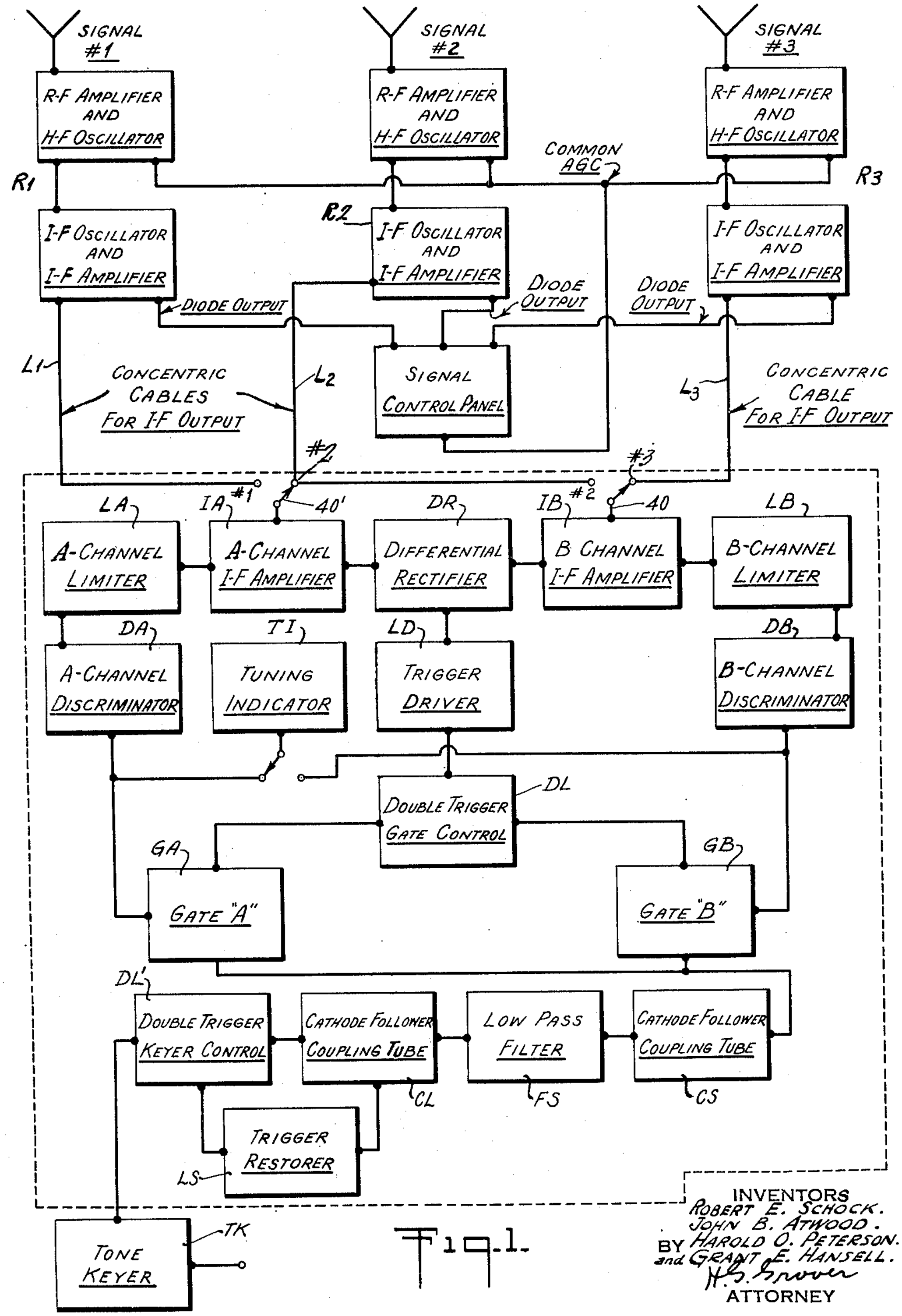

This application relates to receiving systems in general. In particular, this application relates to diversity receivers and the same when used in telegraphy systems of any type, facsimile systems and similar systems using pulse energy of varying magnitude. The application also relates to features of single receivers which may or may not be used in a diversity system and to receivers of modulation of any type such as, for example, on-off telegraphy, amplitude modulation, frequency shift signals, etc. The application also applies to locking circuits and control circuits therefor which are of wide use in the signalling art.

The application in particular relates to receivers of frequency shift signals. Frequency shift signals may be considered frequency modulation signals because in these signals marking characters may be represented by current of one frequency and spacing characters by current of a frequency separated from said one frequency by several hundred cycles. Signals may be produced by keying an oscillator from a first frequency to a second frequency in accordance with signals, or by producing oscillations of different frequencies and keying the oscillations alternatively, or by modulating a low frefuency oscillator between two frequencies and modulating a high frequency carrier by the modulated low frequency oscillations. The signals also have characteristics of on-off telegraphy since they are alternatively present and provide as output, pulse energy the amplitude of which changes between a first value representing mark and a second value representing space.

Diversity receiver systems for keyed telegraphy signals have been in use for some time and have given highly satisfactory service. However, frequency shift telegraphy has the characteristics of frequency modulation and frequency modulation has inherent advantages such as, for instance, an increased signal to noise ratio and other advantages known in the art. An object of our invention is to provide an improved telegraphy receiver system for frequency shift signals to thereby make available the advantages inherent in frequency modulation systems.

We have at hand diversity equipment including radio frequency amplifiers, frequency reducers in the form of heterodyning circuits, automatic gain control connections and additional heterodyning means with intermediate frequency amplifiers feeding detectors and recording apparatus. These systems, however, do not make use of frequency shift telegraphy and as a consequence do not make available advantages inherent in frequency modulation signalling systems. An object of our invention is to provide an adapter for this existing diversity equipment, which adapter will enable the reception of frequency shift signals. This object is accomplished by providing a frequency shift adapter which takes its input from the intermediate frequency stages in the existing equipment and selects the best signal and amplifies and uses the same for recording purposes.

In diversity receivers known in the prior art, means is provided for selecting the output of the best receiver and using it for recording purposes directly, or, indirectly by keying a tone source on and off and using the keyed tone for recording. In these systems the selection of the best signal may be accomplished in various manners. In some systems volume control connections are arranged so that the receiver having the strongest signal sets up a gain control bias for amplifying means in each of the receivers to bias all of the receivers off except that one getting the strongest signal. Other systems for frequency shift telegraphy include means in each of the several receivers which supplies what is called a gating potential to control a gating tube or valve in each of the receivers. The valves or gates are so operated and controlled that the valve or gate for the receiver getting the best signal is opened to supply signal output from that receiver. Simultaneously, the gates or tube valves of the remaining receivers are closed. In these systems as known in the prior art the gating action is slow and does not respond rapidly to changes in the quality of the signals from the several receivers. Such systems may be satisfactory for certain types of signals, but we have found that in frequency shift receiving systems good results cannot be obtained unless fast means is provided for selecting the best receiver output. For example, transmitted signals of this nature are subjected to random fading and the amount of fading may vary with small differences in frequency. We have found that the fading on marking frequency may be much greater than on spacing frequency, even though the mark and space frequencies are separated by but a few hundred cycles. Thus we see that one receiver may get a good signal when the transmitter is on mark interval, and a poor signal when the transmitter is on space interval. On the other hand, a second receiver of the diversity system may have good signals when the transmitter is on space interval, and a poor signal when the transmitter is on mark interval. Obviously, to derive the ultimate benefits from frequency diversity the system for selecting the best receiver output should be fast enough to select the output from one receiver while the signal is on mark interval, and the output from the other receiver while the signal is on space interval.

An object of our present invention is to provide a new and improved and fast acting means for selecting output from that receiver supplying the best output and for shutting off or rejecting the other receiver outputs. This object is attained in accordance with our invention by utilizing a receiver output selecting system of the type which has become known in the art as a gating system. In our system, the control potentials operate through a locking circuit to control the conductivity of multi-grid tubes, each having a control electrode coupled to one receiver and a second control electrode coupled to the locking circuit output. We propose to have a selecting system fast enough to select mark characters on one receiver and space characters on the other receiver or vice versa. To attain this object we provide an improved locking circuit which not only responds substantially instantly to changes in magnitude of the control potential, but also performs a limiting and wave forming function highly effective for the needs at hand.

Where a single locking circuit is used the same is driven by what might be called a direct current source and the change from conduction to cutoff of the triodes during locking circuit reversal tends to be sluggish during the first part of the change, if the driving voltage is slow. The locking circuit is triggered from one condition to another and the tube which has been conducting is gradually brought to a condition near cutoff. The completion of the shift into cutoff then takes place very rapidly. It is desirable, however, that all of the changeover, that is the shift of the tube conditions from conductive to non-conductive, take place very rapidly. An object of our invention is to provide an improved locking circuit wherein the complete reversal process between the two degrees of stability is very rapid. This object is attained, in accordance with our invention, by using a novel double locking circuit with the second stage of the locking circuit excited by the first stage of the locking circuit. The fast portion only (the alternating current component) of the changeover in locking circuit condition described above is fed from the first stage of the locking circuit to the second stage of the locking circuit capacitively and hence, although a large part of the changeover in the first locking circuit is slow, the completion of the changeover takes place rapidly and the entire changeover in the second locking stage takes place rapidly. Thus in the over-all system the gating tubes are controlled substantially instantaneously with changes in the polarity of the direct current control potential. By feeding the fast portion of the first trigger changeover capacitively to the second trigger an extremely fast switching or changeover action is effected by the second trigger circuit. This double trigger is more positive and dependable in action, in addition to being faster than the single locking circuit.

The best signal intercepted by the receivers of the diversity system is selected for use. This is accomplished by supplying signals from two receivers to a differential rectifier circuit which senses which of the signals is the strongest at any and all instants of time and supplies this information in the form of a control potential to the locking circuit driver tube.

The differential detector senses the best signal and provides a potential the polarity of which changes as the signals at the several receivers fade in and out. This potential is to trigger the fast locking circuit to one of its two possible conditions in accordance with the selection made by the differential detector circuit.

The double locking circuit as controlled in turn controls the conductivity of a pair of gating tubes, and an object of our invention is improved gating tube control in accordance with the tripping of the locking circuit. This improved gating tube control turns on fully one of the gating tubes and cuts off definitely the other gating tube. The action is made positive and the inherent positive action of the triggering or locking circuit makes the same ideal for gating tube control.

The gating tubes, as stated above, are alternately on and off so that one thereof or the other supplies the signal used in the recording apparatus and it is obviously of importance that the point at which the gating tubes become conductive will always be the same. An object of our invention is an improved bias fixing or clamp circuit in the gating tube arrangement for maintaining the same gain in the gating tube which is conductive, regardless of which one it is.

By attaining the objects mentioned above the system instantaneously selects at any and all instants of time the detected output of the strongest signal and passes the same along for utilization. The fast selector action enables our system to select a mark character of one diversity signal and the space character of the other diversity signal of the two receiver outputs if the mark and space frequencies are fading relative to each other. Thus, our system minimizes at all times the effects of frequency diversity on the frequency shift system.

The output of the gating tubes is keyed pulse energy with transients thereon resulting from keying, and the same is to be applied to a tube as a direct current control potential, the tube in turn operating to control a second double trigger circuit somewhat as described hereinbefore. An object of our invention is an improved coupling and filtering circuit between the detector output and the double locking circuit control tube for removing therefrom the alternating current component.

In operation, it is desirable to be able to check at all times the operativeness of the gating tubes and a simple and accurate means for doing this is provided. This means includes milliameters in the cathode returns of the gating tubes, the current through which indicates the operativeness of the respective tubes.

In describing our invention reference will be made to the drawings wherein we have illustrated in Fig. 1 by block diagram and in Figs. 2 and 2*a* by circuit element and circuit connection, the essential features of a diversity receiver system arranged in accordance with our invention.

As illustrated in Fig. 1, three receivers R1, R2 and R3 of a standard diversity system in use by applicant's assignee are assumed to be supplying outputs at 50 kc. ± FS by coaxial lines L1, L2 and L3 to the input of our adapter. The receiver outputs have been designated #1, 2, and 3. Our adapter has two signal amplifier channels designated channel B and channel A. Switching means 40 and 40' is provided for selecting as input to the two channels the 50 kc. output of receivers R1 and R3, or R1 and R2, or R2 and R3. In the switch position shown the outputs of receivers R2 and R3 are being used. The receiver not selected may be used as a standby receiver, or the two receivers having the best output may be selected.

Each receiver may include, as illustrated in Fig. 1 a radio frequency amplifier wherein the wave energy is received and amplified. These radio frequency amplifiers may each operate at high frequency and may each include a first detector and mixer, and first oscillator (a common oscillator may be used) and first intermediate frequency amplifiers. They may also include intermediate amplifier oscillators and converters and an automatic volume control diode rectifier. The amplifier's stages may be controlled as to gain in a known manner by automatic gain control potentials supplied from the diodes to the signal control panel to amplifiers in the preceding stages. The output may be at say 50 kc. ± the frequency shift FS. The system as stated hereinbefore is particularly adapted to frequency modulation of the type known as frequency shift telegraphy, in which case the 50 kc. IF is shifted from one frequency representing say mark (high frequency) to another frequency representing space separated from the first frequency several hundred cycles. In the embodiment illustrated in Figs. 1 and 2, three radio frequency amplifiers are assumed to be used and a selected two thereof are assumed to be supplying 50 kc. keyed output to our improved frequency shift keying system. These keying units each comprise two intermediate frequency amplifying channels, B and A, each having a limiter and intermediate frequency amplifier LB and LA, and a discriminator and detector DB and DA which derives pulses corresponding to the freqquency shifts and supplies the same to gating stages GB and GA. Each channel also includes an IF band pass amplifier IB and IA which each feeds signals to a common differential rectifier DR wherein their magnitudes are compared and a resultant potential the magnitude of which indicates which channel has the best signal is developed. This potential controls a locking circuit driver or control stage LD for a double locking stage DL which opens gate A or gate B. The opened gating stage supplies output to a coupling stage CS thence to a filter stage FS and thence to a coupling and locking stage driver CL which controls a double locking circuit DL'. The output controls a tone keyer TK. The double locking circuit DL' is maintained in a selected state of stability by locking circuit restorer LS. A tuning indicator T1 is arranged to be connected to either channel for adjustment of the tuning thereof. In the description which follows, in the sake of brevity and simplicity, one channel will be described in detail. Corresponding reference numerals will be used in so far as possible in both channels, the reference numerals being primed in channel A.

Channel B is arranged to be excited at its input by output from receiver #2 or receiver #3, while channel A is arranged to be excited at its input by signals from receiver #1 or receiver #2. This permits further selection of the signal used and also leaves a standby receiver for emergency use. The receivers may be termed signal pick-up devices or radiant energy pick-up devices.

Figure 2:
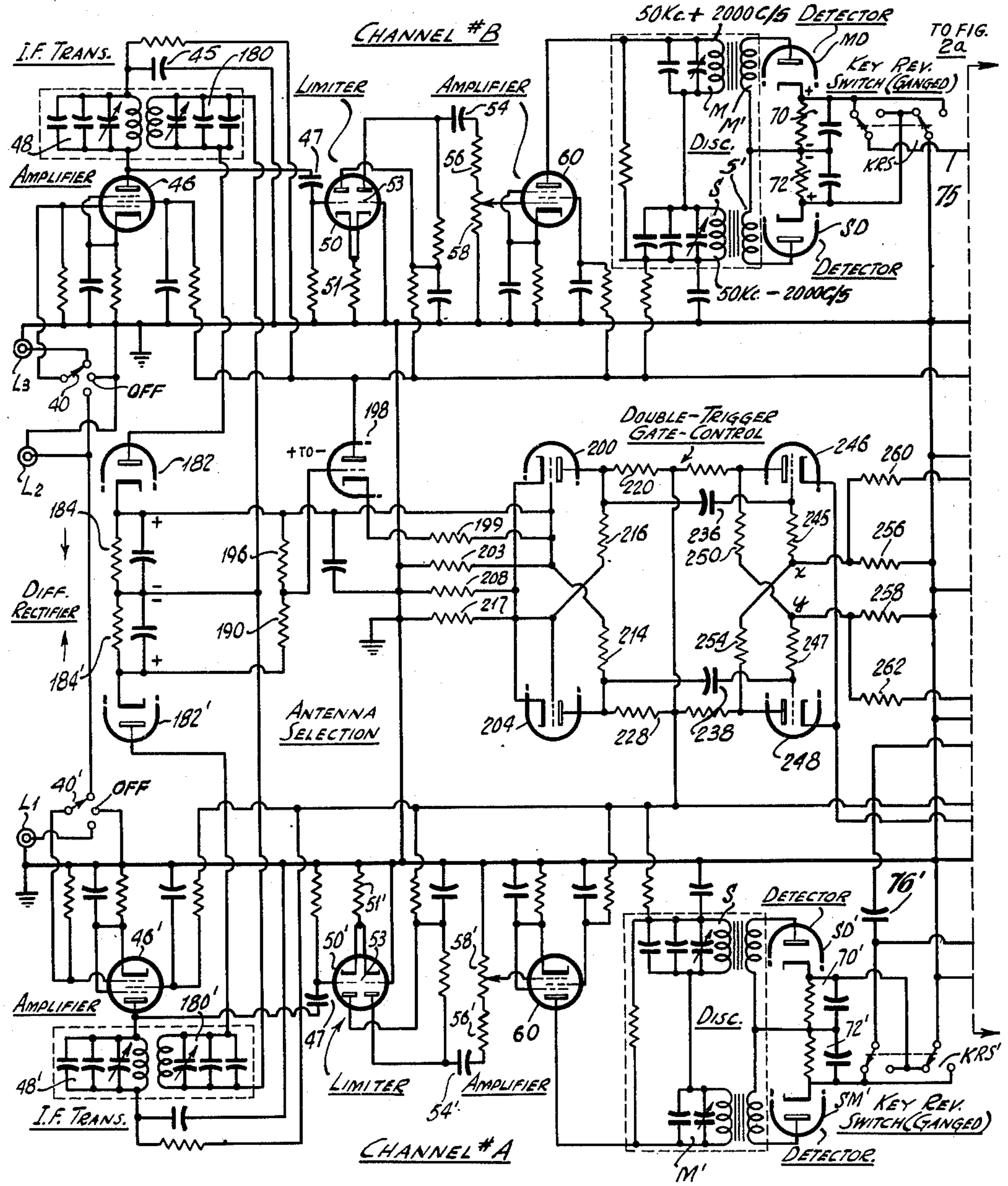
Figure 2A:
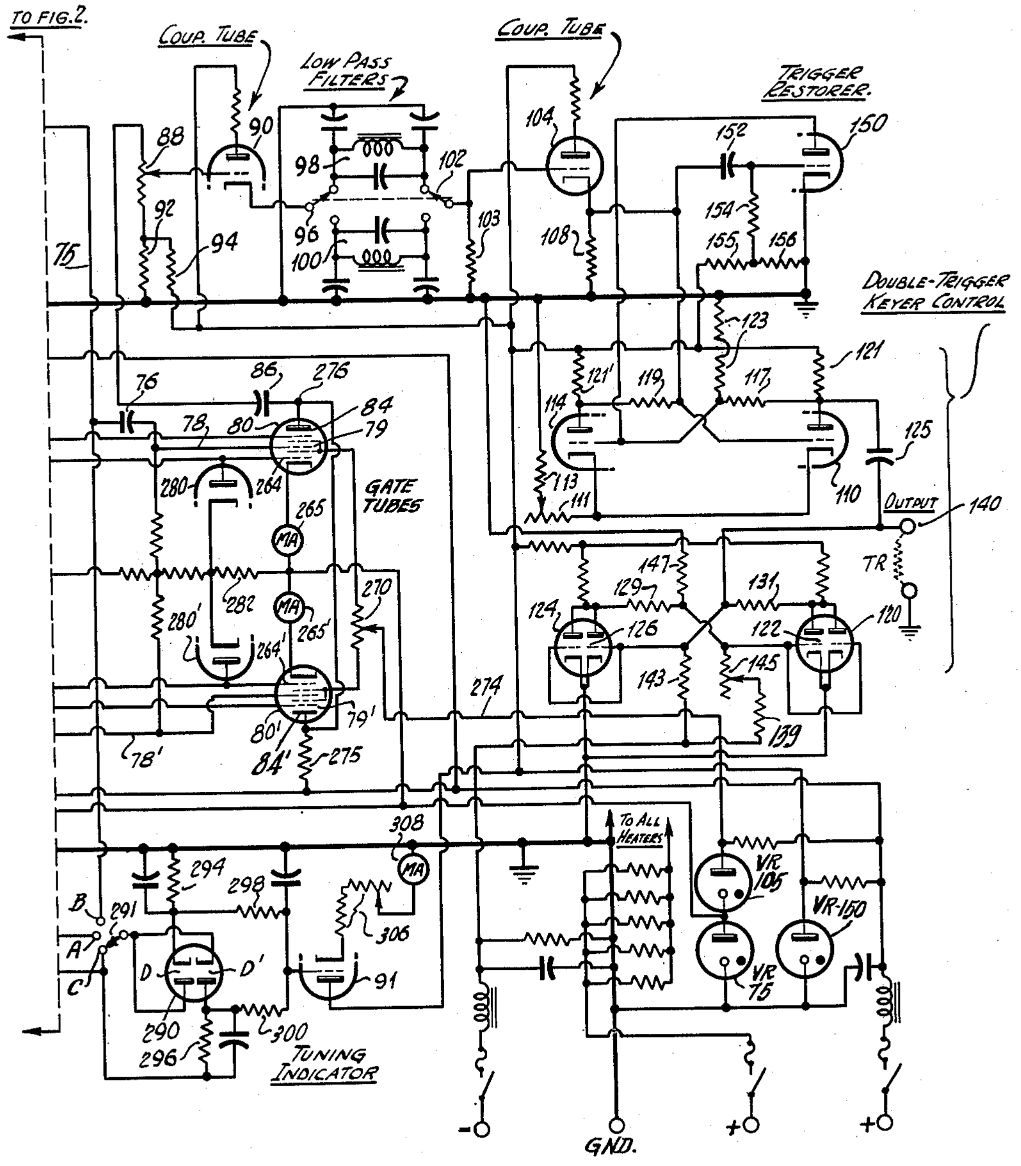

Turning now to channel B, Fig. 2, the 50 kc. ± FS energy is impressed from say receiver #3 by switch 40 and a lead to the control grid of a first IF amplifier stage tube 46 for amplification therein. The tube 46 is connected substantially conventionally, having the usual cathode resistance and condenser unit and grid leak resistance, etc. The anode of the tube 46 is coupled to a circuit 48 tuned to parallel resonance substantially at 50 kc. In practice this circuit is tuned to a frequency intermediate the mark and space frequencies. The low radio frequency potential end of this circuit is connected to the positive terminal of a source of direct current potential and substantially directly to ground and the cathode by a bypassing condenser 45. The amplified intermediate frequency energy is supplied from the anode of tube 46 by a coupling condenser 47 to the control grid of an amplifying and limiting stage including tube 50. The two cathodes of this double triode tube are tied together and connected to ground by a common cathode resistor 51. The grid 53 of the second triode is also grounded. The anode of the first triode is coupled to a source of direct current potential while the anode of the second triode is coupled by a condenser 54, resistance 56 and the potentiometer resistance 58 to the control grid of a following intermediate frequency amplifier stage including tube 60. The amplifying limiter including tube 50 is substantially as disclosed in Crosby U. S. Patent #2,276,565, and is arranged for full wave limiting. This takes place by virtue of the fact that the negative half cycles of the incoming IF wave bias the first half of the double triode 50 to cut off so that negative limiting takes place in the first half on the negative half cycles of the keyed supersonic signals. On the positive half cycles of the supersonic signals the control grid of the first triode becomes less negative or positive so that current flows through the resistance 51, and the potential drop in this resistance is applied to the grid 53 to operate the same beyond cutoff so that negative limiting takes place in the second triode of the limiter stage on the positive cycles of the supersonic signals.

The limited intermediate frequency energy is amplified in the tube 60 and supplied to a discriminator and detector circuit of a modified Conrad type, more specifically the Montjoy type. This discriminator comprises a circuit M tuned slightly amove (2000 ± 100 cycles) say the mark frequency, and a circuit S tuned slightly below (2000 ± 100 cycles) say the space frequency. The windings of the tuned circuits M and S are closely coupled to windings M' and S'. One of the tuned and coupled circuits, say S and S' is adjustably mounted relative to the other circuit M and M' so that the mutual inductive coupling therebetween may be adjusted. By this adjustment the sloping characteristic of the discriminator is centered after the system is tuned. The windings M' and S' are differentially coupled to detectors MD and SD which may comprise diodes, triodes, or other tubes in common or separate envelopes. In the embodiment illustrated diodes in a common envelope are used. The diodes have their cathodes coupled together differentially in a known manner by load impedances and condenser units 70 and 72 wherein potentials are produced representing mark interval when the receiver is at mark frequency or representing space interval when the receiver is at space frequency. In the embodiment being described the potential at the cathode of one diode varies from positive to negative direct current substantially symmetrically about zero potential, the other diode-cathode being grounded.

To reverse polarity the first diode-cathode is grounded and potential at the other diode-cathode used as described.

The diode impedances of units 70 and 72 are coupled with the terminals of a double pole, double throw keying reversing switch KRS. The purpose of this switch is to reverse the polarity of the keying as desired and in the sake of convenience the switch KRS and the corresponding switch KRS' may be ganged. If the recording apparatus is such as to use the higher frequency for mark a transmitted signal which does not use the higher frequency for mark would be reversed at the recording end. Reversing KRS will overcome this defect. Moreover, an operator at the receiver might tune the high frequency oscillator to the wrong side of the signal, thereby reversing the signal. Again the polarity may be corrected by switch KRS. The output terminals of the switch KRS are connected by lead 75 and coupling condenser 76 and lead 78 to the control grid 79 of an electronic gating tube 80, Fig. 2*a*. Tube 80 may be termed an electronic valve, an electron gating valve, an electron control device, or an electrode structure. For the time being assume that the electronic gating tube is conductive so that the description of the signal amplifying chain of B channel may be completed. When 80 is amplifying, the signal is impressed from the anode 84 thereof by coupling condenser 86 and a potentiometer resistance or common load impedance 88 on the control grid of a triode 90. This potentiometer resistor 88 is connected as shown between the control grid of said triode and ground by a resistance 92 while a point between resistances 88 and 92 is connected to the positive direct current potential source through resistance 94. The potentiometer 88 permits adjustment of the signal level on the grid of tube 90 so that the amplitude or direct current voltage of the signal at this point necessary to trigger the double or two-stage locking circuit including tubes 110, 114, 120 and 124 is obtained. The value of this control potential depends in part on the magnitude of the negative potentials on the grids of the locking circuit tubes and is made somewhat larger than the value at which the locking tubes start to trigger. To make this adjustment the switches KRS and KRS' are opened and current of tone frequency is applied to the tube 90 grid. The results of the adjustment are observed on an oscilloscope connected to the output 140 as described hereinafter. In other words, the phenomena known in the radio art as thresholding is made use of in these connections.

In the embodiment illustrated, the tube 90 may be in a separate envelope, but in the system used is in a double triode envelope wherein the other triode 91 is used in the metering circuit, described hereinafter. The cathode of the cathode follower tube 90 is coupled to a switch 96 by means of which the output can be fed through a low pass filter 98 or a low pass filter 100. The filters have different cutoff frequencies, and if the keying speed is low the filter 100 having the lower cutoff frequency is selected.

In any event the amplified filtered signal is then supplied by a switch 102 to the cathode resistor 103 and thence to the control grid of a coupling and isolating tube 104. The amplified filtered signal appears across the resistance 103 in the cathode circuit of tube 90 and grid circuit of tube 104, and the amplified output is taken from the cathode resistance 108. As a consequence, the voltages at the output and the input of the tube 104 are in phase. The cathode follower impedance or load 108 is coupled to the control grid of a tube 110 arranged with tube 114 in a locking circuit. In this locking circuit the anode of tube 110 is coupled to the control grid of tube 114 by a resistance 117, while the anode of tube 114 is coupled to the control grid of tube 110 by a resistance 119, the arrangement being such that in general it may be stated that when current is caused to flow in tube 110 a tripping or switching or triggering action takes place to cut off the current in tube 114. When for some reason current flow is initiated in tube 114 the reverse operation takes place to cut off the tube 110. Thus, this locking circuit has two conditions of electrical stability. Refinements have been added to exalt the tripping action and to further control this circuit, as will be described hereinafter.

To sharpen and further exalt the tripping action the first stage tripping circuit including tubes or electrode structures 110 and 114 is arranged to trigger a second stage locking circuit. This second locking circuit includes tubes 120 and 124. The potential at the anode of tube 110 which rises and falls during the keying-tripping action is supplied to the control grid 126 of tube 124 through condenser 125. The anode of this tube 124 is coupled by resistance 129 to the control grid 122 of the tube 120, while the anode of the tube 120 is coupled by resistance 131 to the control grid 126 of tube 124. The cathodes of the two tubes 120 and 124 are tied together and to ground. The cathodes of the tubes 110 and 114 are connected to ground by variable resistance 111 and fixed resistance 113. The resistance 111 is a means for adjusting the percent mark, i. e., relative weight of mark and space as observed in a cathode ray oscilloscope in the output at 140 or in the tone keyer not shown in Fig. 2*a*. For this adjustment a resistance or common load impedance such as TR is connected across the output. This resistance may be the grid resistance of the tone keyer. The current of tone frequency is again applied to the grid of tube 90. Adjustment for 50% mark is usually made. The output is taken at the terminals 140, one of which is connected to the control grid of tube 124 and anode of tube 110, and the other of which is connected to ground.

The output may be supplied to a tone keyer which may have as an input a grid resistance TR, and as a requirement of operation that the tone keyer grid be operated from about zero to a negative potential. The tripping tube grid 126 runs negative (about −4 volts on mark status and 0 volts on space status) as does the grid 122. When the tone keyer resistance represented at TR is added the potential at grid 126 goes down and becomes less negative. This would unbalance the trigger circuit. To rebalance the trigger circuit a potential divider including resistances 139 and 145, of which 145 is adjustable, and 147 are connected in series in shunt to the grid direct current source. With the current of tone frequency applied to tube 90, resistance 145 is adjusted first in one direction until keyeing stops, and then in the other direction until keying stops. The mean of the two settings is used In the particular arrangement being described a stop-start printer mechanism is to be controlled by the keyer and it is essential that signals terminate on a mark character and start on a space character. The transmitter is arranged to end on a mark character. In the embodiment described, the tube 114 is non-conductive in the mark condition. The tube 110 is then conductive. The transmitter will stop on mark but the possibility exists that a burst of static will pass through the receiver and operate the trigger so that it flips to the space position, i. e., to a condition where current flows through tube 114. If this happens the printer mechanism will continuously rotate and will not start in synchronism when keying recommences on a space character. To overcome this effect a trigger restorer circuit including tube 150 is provided to assure that the tripping circuit including tubes 110 and 114 is always brought to rest in mark condition with tube 114 non-conductive at the end of a message, or returned to this condition if static or other disturbance operates to trip the circuit from this rest condition. The control grid of the trigger restorer tube 150 is coupled by condenser 152 to the output cathode impedance 108, and by grid leak resistance 154 to the resistors 155 and 156 of a voltage divider across the direct current supply source.

The grid of tube 150 is maintained slightly positive by virtue of voltage supplied from the voltage divider resistances 155 and 156 through resistance 154 to the said grid. If no signals are received this tube 150 will present a low impedance plate to cathode circuit. One plate to cathode external shunt circuit of tube 150 includes the resistance 123, which with resistances 117 and 121 forms a potential divider across the direct current source.

In mark condition a positive pulse is applied at 102, appears across 108, and is applied to the grid of tube 110 so tube 110 is conductive and tube 114 is non-conductive. It should be kept in mind that the received signals are to terminate on mark and start on space. We will assume, however, that static or other disturbance has tripped the circuit so that tube 110 is cut off and tube 114 in conductive. Then there is a large potential drop across resistor 123, since tube 110 is cut off thus raising the potential at its plate which is applied to the voltage divider including resistors 117, 121 and 123, to produce the positive voltage required for the grid of tube 114 to make the same conductive. However, tube 150 has its output impedance across this resistor 123 and since its grid is made slightly positive by resistance 154, and potential divider resistances 155 and 156, in the absence of keying, tube 150 presents a low impedance. Current flows in tube 150 and resistances 117 and 121 and the potential on the grid of tube 114 is reduced by the low impedance path through tube 150 and the trigger circuit flips to its condition of stability at mark frequency, i. e., tube 114 is made non-conductive and tube 110 is conductive.

After keying signals have been applied for some time, tube 150 becomes cut off due to bias built up on its grid and held by the time constant circuit including condenser 152 and resistance 154. The time constant is long relative to the keying speed. When the keying stops, this bias will gradually leak off and tube 150 grid becomes slightly positive and the tube 150 will be conditioned to restore the trigger circuit if it is not in the proper state of stability.

This tube 150 performs another function between the time the keying starts and cutoff bias is built upon its grid. It helps throw the trigger as controlled by mark and space voltages by the following action.

In the invention as described, the first thing that happens when keying commences is appearance of a negative pulse representing space across resistor 108 which is coupled to the grid of tube 150 through condenser 152. This is of large enough amplitude to cut off tube 150. This in turn applies a positive pulse to the grid of tube 114 (the drop across resistance 123) which will help throw the trigger circuit. The negative applied pulse is also and simultaneously applied to the grid of tube 110 which is the normal way the trigger is tripped when tube 150 is finally cut off by the bias supplied by the keying. This locking circuit restoring means has been described and claimed in Atwood et al. U. S. application Serial #618,760, filed September 26, 1945 now Patent No. 2,511,093, dated June 13, 1950.

Our improved means for selecting the best signal by opening the gating tube 80 or 80′ excited by the receiver having the best signal will now be described with reference to Fig. 2. The supersonic signal amplified by tube 46 appears as stated before in the tuned circuit 48 and this circuit includes a winding forming the primary of a transformer having a secondary winding in a tuned circuit 180 coupled in shunt to the impedance constituted by the diode 182 and its load resistance 184. The diode 182 may be in a separate envelope or in a double diode envelope as shown. The other diode section 182′ and its load resistance 184′ is similarly coupled to the tuned secondary winding 180′. The transformers 180 and 180′ are tuned to center on 50 kc.±200 cycles and have a pass band wide enough to assure no frequency discriminating action at the frequencies passed. In the embodiment used the band pass characteristics are substantially flat over a range of 5500 cycles. The currents passed thereby are to be compared as to magnitude to derive the gating action.

The load resistors 184 and 184′ are connected in series, and together with diodes 182 and 182′ constitute a differential rectifier circuit or differential detector system. The differential detectors produce across resistors 184 and 184′ potentials which depend on the signal strength. A voltage divider network consisting of resistors 190 and 196 is connected in shunt with the load resistor network comprised by resistances 184 and 184′. A point between the divider 190 and 196 is connected to the control grid of tube 198 which is a trigger driver tube. The low side of the divider network, comprised of resistances 190 and 196, is connected to the cathode of the trigger driver tube 198 through resistance 199. Therefore that part of the differential rectifier output which appears across resistance 196 of the divider network is applied to the grid of tube 198. The cathode of tube 198 is also connected to ground by resistance 199 and resistance 203. A point between these resistances is connected to the control grid of a tube 200 of the double-trigger gate control circuit. Therefore, voltage changes which occur in the tube 198 cathode resistor, 203, are applied to the grid of tube 200. Tubes 200 and 204 are included in the first trigger circuit or stage of the double-trigger or two-stage gate control circuit or locking circuit. The operation of the trigger driver for the differential rectifier and a trigger circuit are described in Schock U. S. Application Serial #630,429, filed November 23, 1945, now abandoned. The cathodes of these tubes or electrode structures are connected together and in turn are connected to ground through resistor 208. The grid of tube 200 also connects to the anode of tube 204 through resistor 214 and to ground through resistance 203. The grid of tube 204 connects to the anode of tube 200 through resistor 216 and to ground through resistor 217. The anodes of tubes 200 and 204 are connected to the positive terminal of a direct current potential source through resistors 220 and 228 respectively. The anodes of tubes 200 and 204 are coupled by condensers 236 and 238 to the control grids of tubes 246 and 248 respectively, which are included in the second trigger circuit or second stage of the double trigger gate control circuit by resistors 250 and 254. The grid of tube 246 is connected to ground by resistor 256 while the grid of tube 248 is connected to ground by resistor 258. The cathodes of tubes 246 and 248 are tied together and connected to a voltage regulated positive potential point on the power supply. The cathodes of the gate valves 80 and 80′ are also held at this positive potential which is about 75 volts D. C.

Tubes 246 and 248 have their anodes and control grids cross-connected so that they form a locking circuit as described in connection with tubes 200 and 204. In general it may be stated that the arrangement is such that tubes 200 and 204 are alternatively conductive because when the anode potential of one thereof drops because of current flow therein the control grid of the other thereof becomes more negative to cut off current in the other tube. Thus, this arrangement constitutes a locking circuit having two conditions of electrical stability. Likewise, it may be said that the tubes 200 and 246 are alternatively conductive because when the potential on the anode of tube 200 drops said drop appears on the control grid of tube 246 through condenser 236, thus decreasing the conductivity of tube 246 to reduce current flow therein. This reduction in tube current makes the anode of tube 246 more positive, and this increase in positive potential operates through the cross-coupling resistances to make the grid of tube 248 more positive so more current flows therein and the tripping action takes place to cut off the current in tube 246. It may also be said that tubes 200 and 248 are tripped in synchronism.

The grid leads to tubes 246 and 248 include resistances 245 and 247 so that the differentially varying potentials on these points swing through a much larger range than the excitation potential at the anodes of tubes 200 and 204. The reason for this is set forth in detail in the abandoned Atwood U. S. application Serial #618,761, filed September 26, 1945. The differentially varying potentials are applied by resistances 260 and 262 to the control grids 264 and 264′ of the tube gates 80 and 80′, Fig. 2*a*. The tubes 80 and 80′ have their anodes 84 and 84′ tied together and connected as described hereinbefore through condenser 86 to the coupling tube 90.

The second grids of 80 and 80′ are connected together by the resistance of a potentiometer 270. A tap on this resistance is connected by lead 274 to a voltage regulated positive point on the direct current supply source. The potentiometer including resistor 270 forms means for balancing the operation of the gate tubes 80 and 80′. By means of the gate balance adjustment the voltage drop across the common output lead of the tubes 80 and 80′, i. e., across resistor 275 with no signal applied may be made the same regardless of which gate tube is conducting. The test for balancing is made by measuring the voltage from the common gate tube plate connection at point 276 to the high side of the voltage regulator tube VR105 with first one gate tube conducting and then the other. To make this adjustment the switches 40 and 40′ may be set on the off contacts and the point on potentiometer resistance 270 adjusted or moved until the voltage reads the same (within 2 or 3 tenths of a volt) for either gate conducting. The gate tube conductivities may be reversed at will by flipping the gate control locking circuits including tubes 200, 204, 246 and 248 by shorting the control grid of one of the tubes to ground momentarily.

As the potential on the control grid of 198 varies in selecting the best signal output as determined by the differential detectors the locking circuit tube 200 is tripped one way or the other and a voltage change takes place across resistors 220 and 228 of the tubes 200 and 204, and the pulse so generated varies slowly during a portion of the tripping action and then rapidly at the end of the tripping action. The pulse so generated appears on the condensers 236 and 238 and at the rapid portion thereof instantly trips the locking tubes 246 and 248 so that the second locking tubes 246 and 248 reverse each time the first pair of locking tubes reverses. The voltages across the resistors 256 and 258 are fed to the grids 264 and 264′ of the gating tubes 80 and 80′. When the second trigger is locked one way the voltages across the resistors 256 and 258 are such that one gate tube 80 or 80′ is biased to cutoff and the other is biased on. When the locking circuit reverses, the voltages across these resistors change differentially so that the gate tube which was cut off is turned on and the gate tube which was turned on is cut off. The trigger control voltage applied to the grids 264 and 264′ of the gating tubes is about 33 volts negative with respect to the gate tube cathode potentials, which are positive with respect to ground. The trigger control voltage applied to the first grid of one of the gate tubes to make it conductive is positive enough with respect to that gate tube cathode so that one of the diodes or electron flow paths 280 or 280′ connected across the grids of the gate tubes 80 and 80′ becomes conductive and restricts the bias on the first grid of that gate tube to a bias determined by the drop across the resistor 282 of the potential divider to which the cathodes of the diodes are connected. The potential divider including resistor 282 is across a potential source regulated by the tube VR—75. In this manner the grid 264 or the grid 264′ of the conducting gate tube is held negative with respect to the cathode of the gate tube by a fixed adjustable amount, of the order of 5 volts, depending on the circuit tolerances.

To aid in tuning the receiver to frequency shift signals, a novel tuning indicator including tube 290 has been provided. The tube 290 is a double diode having the cathode of one diode and the anode of the other diode connected to a switch 291 having contact points A, B and C, of which points A and B are connected to the discriminator detector outputs of channels A and B respectively and of which C is connected to ground. The outputs of these two rectifiers appear across the resistors 294 and 296 and are fed by resistors 298 and 300 to the control grid of a triode 91 which in the embodiment used is included in a double triode envelope including tube 90. This triode tube 91 has its anode connected to the positive terminal of the supply source and its cathode connected by an adjustable resistance 306 and a milliammeter 308 to ground. The tube with its cathode resistor 306 and milliammeter 308 acts as a cathode follower type vacuum tube voltmeter. This voltmeter, in combination with the double rectifier circuit feeding it, is described and claimed in Hansell U. S. application Serial No. 632,979, filed December 5, 1945, now Patent No. 2,495,326, dated January 24, 1950.

With a single printer circuit or slow speed telegraphy circuit tuning by ear is very satisfactory with a little practice. However, with high speed signals the exact tuning point is not so easily recognized by ear. The novel indicator just described permits easy and accurate tuning of the system. The rectifiers in 290 are so biased that peaks only of the discriminator detector outputs are rectified. One diode, say D, is a negative peak rectifier, the other D′, a positive peak rectifier. The diode outputs are balanced against each other by resistors 294, 296, 298 and 300 so that the cathode follower voltage meter including tube 91 reads the differential of the diode outputs. Since the discriminator output mark and space characters appear as negative and positive pulses, the one diode rectifies the peak mark pulse and the other diode rectifies the peak space characters. When the signal is in tune the peaks of these positive and negative characters are equal as shown on the voltmeter. With the switch 291 on contact A the channel A is adjusted so that the pulses representing mark and space are equal. With the switch 290 on contact B channel B is similarly adjusted. With the switch 291 on contact C, i. e., with the diodes connected to ground, the cathode meter 308 should have a minimum voltage reference mark as a reference point for convenience. This mark may well be at the middle of the scale. If with the above setting the meter hand does not fall on the reference line, the variable resistor 306 is adjusted until it does.

The supply source is substantially conventional and includes, in addition to the voltage regulator tubes mentioned above, a voltage regulator tube VR150 which supplies a constant direct current potential to various tube electrodes including the anode of the cathode follower voltmeter tube 91 and the anodes of the locking tubes 110, 114, 124, 120 and the coupling tubes 90 and 104, etc.

In operation, signals are amplified by receivers connected to spaced antennas and supplied as input to channels A and B wherein they are amplified, limited in amplitude and supplied to the discriminators and detectors. The detector outputs are supplied to the gating valves 80 and 80′. One of the gating valves 80 and 80′ is open depending upon the position to which the locking circuit including tubes 200, 204, 246 and 248 has been tripped. The position to which the locking circuit has been tripped depends upon which signal is the best as discerned by the differential rectifier including tubes 182 and 182′, the output of which controls the locking circuit. One receiver's output is let through by a gating tube and fed to the coupling tube 90. The meters 265 and 265′ in the cathode return circuits of tubes 80 and 80′ indicate which gate tube is conducting and which gating tube is not conducting. However, it should be noted that when the signal representing mark is best in one receiver and the signal representing space is best in the other receiver the meters 265 and 265′ both show current flow in the gating tubes because the meters are too slow or have too much inertia to follow the locking circuit reversals, which are fast enough to take mark from one channel and space from the other channel. However, when mark and space are received on one channel, the meter in the gating tube connected to that channel will show substantial current flow while the meter in the gating tube of the other channel, being blocked, will show no current flow.

The signal passed by the open gating tube is fed to the coupling tube 90 and thence to one of the low pass filters serving with resistor 103 as a cathode follower output load. One filter, say the filter 98, has an upper cutoff at 880 cycles, while the other filter, say 100, has an upper cutoff at 200 cycles. The filter used depends upon the keying speed. The filter output, which is now substantially pure direct current pulse energy, is fed to the coupling tube 104 and from its cathode resistor 108 to the grid of the locking circuit tube 110 and the grid of the trigger restorer tube 150. The locking circuit reverses in accordance with variations in magnitude of the direct current across 108 and the reversals appear as potential variations at the output 140 for utilization as desired. In the embodiment used the frequency shift signals start on space, at which time tube 114 is conductive and tube 110 is cut off. The signals end on mark, at which time tube 114 is non-conductive and tube 110 is conductive. The trigger restoring tube 150 operates as described above to assure that this locking circuit is left in the mark condition, irrespective of static or similar excitation.

What is claimed is:

1. In signaling apparatus, in combination, a plurality of signal pick-up devices, means for comparing the relative strengths of the signals picked up and for producing a potential the polarity of which is positive or negative with respect to a reference level depending on which signal is strongest, an electronic valve for each pick-up device excited by the signal picked up by said device, means controlled by said potential and operating on said valves to make one thereof conductive to pass the strongest signal, an output circuit, a load impedance common to all of said valves, and a locking circuit, having two conditions of electrical stability and comprising a pair of intercoupled electrode structures, so arranged that the flow of current in one structure causes a cessation of current in the other structure, and vice versa, coupling said load impedance to said output circuit.

2. In a diversity receiver system in combination, two radiant energy pick-up devices responsive to signals represented by radiant energy, a differential detector system coupled to the pick-up devices and excited by currents generated in said pick-up devices by the signals picked up thereby for comparing the relative strengths of the signals picked up and for producing a direct current potential the polarity of which is positive or negative with respect to a reference level depending on which signal is stronger, an electronic valve for each of the two pick-up devices excited by the picked-up signal, a locking circuit, having two conditions of electrical stability and comprising a pair of intercoupled electrode structures, so arranged that the flow of current in one structure causes a cessation of current in the other structure, and vice versa, controlled by said potential and having the two structures thereof coupled respectively to corresponding ones of said two valves for making that one thereof conductive which is excited by the stronger signal, depending on the polarity of said produced potential, an output circuit, and a second locking circuit, having two conditions of electrical stability and comprising a pair of intercoupled electrode structures, so arranged that the flow of current in one structure causes a cessation of current in the other structure, and vice versa, coupling said output circuit to said valves.

3. In a diversity system, in combination, a plurality of pick-up devices each having an input excited by signal modulated wave energy, an electron gating valve for each of said devices, a common output impedance coupled to said gating valves, means for comparing the wave energies supplied to the different devices and for deriving a varying direct current potential the polarity of which is positive or negative with respect to a reference level depending upon which signal is strongest, a locking circuit, having two conditions of electrical stability and comprising a pair of intercoupled electrode structures, so arranged that the flow of current in one structure causes a cessation of current in the other structure, and vice versa, controlled by said potential, means coupling the two structures of said locking circuit respectively to corresponding gating valves to control the conductivity thereof in a manner to make that one of said gating valves getting the strongest signal operative to repeat the same in said output impedance, and a locking circuit, having two conditions of electrical stability and comprising a pair of intercoupled electrode structures, so arranged that the flow of current in one structure causes a cessation of current in the other structure, and vice versa, in said coupling between said common output impedance and said gating valves.

4. In a diversity system for wave energy shifted in accordance with signals from a first frequency to a second frequency, a plurality of channels each including a frequency discriminator and a detector, each channel having an output and each channel having an input excited by said wave energy, a gating valve for each channel, each gating valve having at least one control electrode and an output electrode, means for comparing the wave energies fed to the inputs of a pair of channels and for deriving therefrom a potential the polarity of which is positive or negative with respect to a reference level depending upon which of the wave energies fed to said pair of channels it is desired to use, a double locking circuit controlled by said potential, said circuit including first and second stages with the second stage excited by the first stage and with the first stage connected to be controlled by said potential, each of said stages comprising a locking circuit, having two conditions of electrical stability and comprising a pair of intercoupled electrode structures, so arranged that the flow of current in one structure causes a cessation of current in the other structure, and vice versa, means coupling the two second stage structures of said locking circuit respectively to corresponding control electrodes of two of said gating valves, a coupling between each channel output and a control electrode of the gating valve therefor, an output circuit, and a double locking circuit coupling the output electrodes of said gating valves to said output circuit, said last-named locking circuit including first and second stages with the second stage excited by the first stage, with the first stage coupled to said output electrodes, and with the second stage coupled to said output circuit, each of said stages comprising a locking circuit, having two conditions of electrical stability and comprising a pair of intercoupled electrode structures, so arranged that the flow of current in one structure causes a cessation of current in the other structure, and vice versa.

5. In a diversity system for wave energy shifted in accordance with signals from a first frequency to a second frequency, a plurality of channels each including a frequency discriminator and a detector, each channel having an output and each channel having an input excited by said wave energy, a gating valve for each channel, each gating valve having at least one control electrode and an output electrode, a common load impedance coupled to the output electrodes of the gating valves, means for comparing the strengths of the wave energies fed to the inputs of a pair of channels and for deriving therefrom a unidirectional potential the polarity of which is positive or negative with respect to a reference level depending upon the relative strengths of the wave energies fed to said pair of channels, a locking circuit, having two conditions of electrical stability and comprising a pair of intercoupled electrode structures, so arranged that the flow of current in one structure causes a cessation of current in the other structure, and vice versa, controlled by said potential, means coupling the two structures of said locking circuit respectively to corresponding control electrodes of two of said gating valves, a coupling between each channel output and a control electrode of the gating valve therefor, an output circuit, and a locking circuit, having two conditions of electrical stability and comprising a pair of intercoupled electrode structures, so arranged that the flow of current in one structure causes a cessation of current in the other structure, and vice versa, coupling said common load impedance to said output circuit.

6. In a receiver system, in combination, two electron control devices each having an output electrode and a plurality of control electrodes, an output circuit coupled to said output electrodes, two means for amplifying and detecting modulated wave energy, means for applying the output of one detecting means to a control electrode of one of said devices, means for applying the output of the other detecting means to a control electrode of the other of said devices, means for deriving a potential the polarity of which is positive or negative with respect to a reference level depending upon which of the modulated wave energies is stronger, a locking circuit, having two conditions of electrical stability and comprising a pair of intercoupled electrode structures, so arranged that the flow of current in one structure causes a cessation of current in the other structure, and vice versa, controlled by said potential, and means coupling the two structures of said locking circuit respectively to corresponding other control electrodes of said first-named two devices.

7. In a receiver system, in combination, two electron control devices each having an output electrode and a plurality of control electrodes, two separate means for amplifying and detecting a modulated wave, means for applying the output of one of the detecting means to a control electrode of one of said devices, means for applying the output of the other of the detecting means to a control electrode of the other device, means for deriving a potential the polarity of which is positive or negative with respect to a reference level depending upon which of the detected waves is stronger, a double locking circuit controlled by said potential, said circuit including first and second stages with the second stage excited by the first stage and with the first stage connected to be controlled by said potential, each of said stages comprising a locking circuit, having two conditions of electrical stability and comprising a pair of intercoupled electrode structures, so arranged that the flow of current in one structure causes a cessation of current in the other structure, and vice versa, and means coupling the two second stage structures of said locking circuit respectively to corresponding other control electrodes of said first-named two devices.

8. In a diversity system for wave energy keyed in accordance with signals from a first frequency to a second frequency, two pick-up devices each having an input excited by said wave energy, two frequency discriminators and detectors each having an output and having their respective inputs coupled to a different pick-up device, an electron gating valve for each of said devices, each gating valve having at least one control electrode and output electrodes, a common output impedance coupled to the output electrodes of both gating valves, means for comparing the strengths of the wave energies fed to the devices and for deriving therefrom a potential the polarity of which is positive or negative with respect to a reference level depending upon the relative strengths of the wave energies, a locking circuit, having two conditions of electrical stability and comprising a pair of intercoupled electrode structures, so arranged that the flow of current in one structure causes a cessation of current in the other structure, and vice versa, controlled by said potential, means coupling the two structures of said locking circuit respectively to corresponding control electrodes of said two valves, a coupling between the output of each detector and a control electrode of a different one of said gating valves, an output circuit, and a locking circuit, having two conditions of electrical stability and comprising a pair of intercoupled electrode structures, so arranged that the flow of current in one structure causes a cessation of current in the other structure, and vice versa, coupling said common impedance to said output circuit.

9. In a diversity system for wave energy keyed in accordance with signals from a first frequency to a second frequency, two channels each having input terminals excited by said wave energy, two frequency discriminators and detectors each having an output and having their respective inputs coupled to a different channel, an electron gating valve for each of said channels, each gating valve having two control electrodes and having output electrodes, a common output impedance coupled to the output electrodes of both valves, a differential detector arrangement for comparing the strengths of the wave energies fed to the two channels and for deriving therefrom a unidirectional potential the polarity of which is positive or negative with respect to a reference level depending upon the relative strengths of the compared wave energies, a double locking circuit controlled by said potential, said circuit including first and second stages with the second stage excited by the first stage and with the first stage connected to be controlled by said potential, each of said stages comprising a locking circuit, having two conditions of electrical stability and comprising a pair of intercoupled electrode structures, so arranged that the flow of current in one structure causes a cessation of current in the other structure, and vice versa, means coupling the two second stage structures of said locking circuit respectively to corresponding control electrodes of said two valves, a coupling between the output of each detector and different control electrodes of corresponding ones of said gating valves, an output circuit, and a double locking circuit coupling said common impedance to said output circuit, said last-named locking circuit including first and second stages with the second stage excited by the first stage, with the first stage coupled to said common impedance, and with the second stage coupled to said output circuit, each of said stages comprising a locking circuit, having two conditions of electrical stability and comprising a pair of intercoupled electrode structures, so arranged that the flow of current in one structure causes a cessation of current in the other structure, and vice versa.

10. In a signaling system for wave energy keyed from a first frequency representing mark to a second frequency representing space, which wave energy terminates at one of said frequencies, in combination, a pair of frequency discriminators and detectors each excited by said wave energy for deriving potentials which shift from one value representing mark to a second value representing space, and which terminate at one of said values normally, a gating valve for each discriminator and detector having an electrode excited by the detector output, means for comparing the strengths of the wave energies exciting said two discriminators and for deriving a potential the polarity of which is positive or negative with respect to a reference level depending on the relative strengths of the wave energies exciting said discriminators, a locking circuit, having two conditions of electrical stability and comprising a pair of intercoupled electrode structures, so arranged that the flow of current in one structure causes a cessation of current in the other structure, and vice versa, having the two structures thereof coupled respectively to corresponding electrodes of said gating valves, means coupling said locking circuit to said first-named means to control the position of said locking circuit by said potential, a common load impedance for said gating valves, a filter having an input coupled to said common load impedance, said filter having an output wherein appears pulse energy of a magnitude which varies between two values, one representing mark and the other space, which pulse energy normally terminates at one of said values, a tripping circuit, similar to said locking circuit, controlled by said pulse energy and having two positions of stability, one of which represents mark and the other space, so that said tripping circuit comes to rest in one position determined by the value at which the pulse energy terminates, means for restoring said tripping circuit to said one position of rest in case the same is tripped therefrom by energy due to static or similar disturbances, and an output circuit coupled to said tripping circuit.

11. In a diversity receiver system, in combination, two modulated wave detectors each having input electrodes excited by modulated wave energy, an electron gating valve for each of said detectors, said gating valves having a common load impedance, a biasing circuit for said gating valves for applying thereto a negative potential, a coupling between each detector and an electrode of its gating valve, means for comparing the strengths of the wave energies supplied to the two detectors and for deriving a unidirectional potential the polarity of which is positive or negative with respect to a reference level depending upon the relative strengths of the said wave energies, a locking circuit, having two conditions of electrical stability and comprising a pair of intercoupled electrode structures, so arranged that the flow of current in one structure causes a cessation of current in the other structure, and vice versa, controlled by said unidirectional potential, means coupling the two structures of said locking circuit respectively to corresponding electrodes of said two gating valves, said last-named means being arranged to apply to one or the other of the gating valves, depending on the condition of the locking circuit, a positive biasing potential sufficient to make one or the other of said gating valves conductive, means including an electron flow patch in each biasing coupling for limiting the bias variations in a positive direction, an output circuit, and a locking circuit, having two conditions of electrical stability and comprising a pair of intercoupled electrode structures, so arranged that the flow of current in one structure causes a cessation of current in the other structure, and vice versa, coupling said common impedance to said output circuit.

12. In signaling apparatus, in combination, two signal pick-up devices, means for comparing the relative strengths of the signals picked up and for producing a potential the polarity of which is positive or negative with respect to a reference level depending on which signal is stronger, an electronic valve for each pick-up device having an input excited by the signal picked up by said device, a load impedance coupled to the output of both valves, a two-stage locking circuit controlled by said potential, the second stage of said circuit being excited by the first stage and the first stage being connected to be controlled by said potential, each of said stages comprising a locking circuit, having two conditions of electrical stability and comprising a pair of intercoupled electrode structures, so arranged that the flow of current in one structure causes a cessation of current in the other structure, and vice versa, and means coupling the two second stage structures of said two-stage circuit respectively to corresponding valves to make one of the latter conductive.

13. In a diversity system for wave energy keyed in accordance with signals from a first frequency to a second frequency, a plurality of channels each having an output and having an input excited by said signals, a gating valve for each of said channels, each gating valve having input electrodes including two control electrodes and having output electrodes, means for impressing the signals in the output of each channel on a control electrode of a different one of said gating valves, a common output circuit coupled to the output electrodes of the gating valves, means for comparing the strengths of the signals fed to the channels and for deriving therefrom a unidirectional potential the absolute polarity of which depends upon the relative strengths of the signals, a locking circuit, having two conditions of electrical stability and comprising a pair of intercoupled electrode structures, so arranged that the flow of current in one structure causes a cessation of current in the other structure, and vice versa, controlled by said potential, and a coupling between said locking circuit and the other control electrodes of the gating valves.

14. In a diversity receiver system, in combination, a plurality of electrode structures each including an output electrode and a plurality of control electrodes, a common output circuit coupled to all of said output electrodes, a like number of signal channels having inputs on which signal modulated wave energy is impressed and having outputs from which representative energy is taken, means for applying the output of each channel to one control electrode of a different one of said structures, the arrangement being such that each channel supplies its output to a structure appropriate to said channel, signal strength comparing and detecting circuits for deriving a potential the absolute polarity of which depends upon which of the modulated wave energies in said plurality of channels is the strongest, a locking circuit, having two conditions of electrical stability and comprising a pair of intercoupled electrode structures, so arranged that the flow of current in one structure causes a cessation of current in the other structure, and vice versa, controlled by said potential, and a coupling between said locking circuit and the remaining control electrodes of said first-mentioned structures, the arrangement being such that the said potential operates the locking circuit in such a manner as to cause the first-mentioned structure connected with the channel wherein the modulated wave energy is strongest to supply output from such channel to the common output circuit.

ROBERT E. SCHOCK.
JOHN B. ATWOOD.
HAROLD O. PETERSON.
GRANT E. HANSELL.

REFERENCES CITED

The following references are of record in the file of this patent:

UNITED STATES PATENTS

| Number | Name | Date |
|---|---|---|
| 1,792,312 | Labus | Feb. 10, 1931 |
| 2,211,750 | Humby et al. | Aug. 20, 1940 |
| 2,253,832 | Peterson | Aug. 26, 1941 |
| 2,253,867 | Whitaker | Aug. 26, 1941 |
| 2,270,449 | Kahn | Jan. 20, 1942 |
| 2,282,526 | Moore | May 12, 1942 |
| 2,383,126 | Hollingsworth | Aug. 21, 1945 |
| 2,384,456 | Davey | Sept. 11, 1945 |
| 2,414,111 | Lyons | Jan. 14, 1947 |
| 2,447,057 | Crosby | Aug. 17, 1948 |

FOREIGN PATENTS

| Number | Country | Date |
|---|---|---|
| 540,233 | Great Britain | Oct. 9, 1941 |